Oct. 13, 1931.  C. G. PALMER  1,826,818

ICE CREAM SCOOP

Filed Nov. 1, 1930

INVENTOR
Charles G. Palmer
BY
Fredk C. Fischer
ATTORNEY

Patented Oct. 13, 1931

1,826,818

UNITED STATES PATENT OFFICE

CHARLES G. PALMER, OF IRVINGTON, NEW JERSEY

ICE CREAM SCOOP

Application filed November 1, 1930. Serial No. 492,678.

This invention relates to ice cream scoops and more particularly to means for facilitating and reducing the cost of manufacturing such devices.

Heretofore, ice cream scoops have been made with a main supporting shank. Such shanks were made in the foundry, considerable time and expense being necessary to finish the casting for use in an ice cream scoop.

It is an object of this invention to provide an ice cream scoop having a shank which may be readily assembled from elements of common shape, it not being necessary to resort to the foundry.

A further object is the provision of an ice cream scoop having a scraper operating lever which is fulcrumed on the hand grip, thus reducing the number of elements adjacent the material being scooped, at the same time enabling the scoop to be cleaned more easily than heretofore.

These and other advantageous objects, which will later appear, are accomplished by the simple and practical construction and arrangement of parts hereinafter described and exhibited in the accompanying drawings, forming part hereof, and in which.

Figure 1:
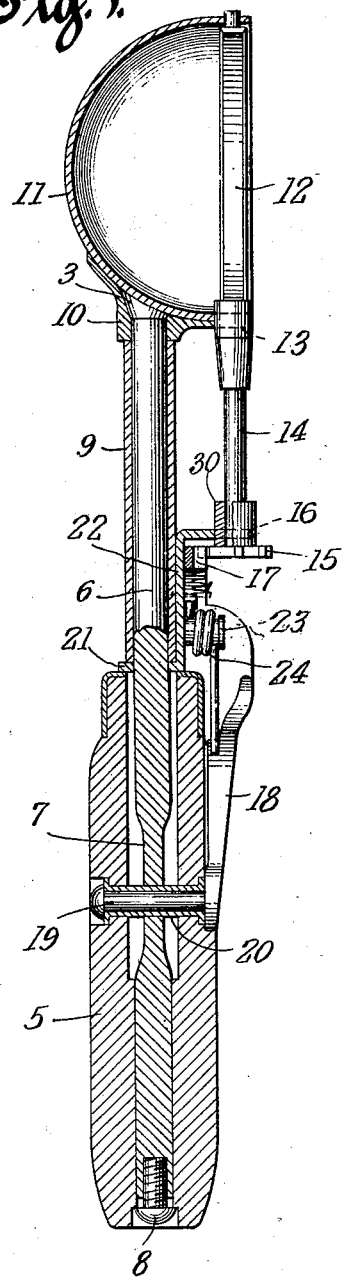
Figure 1 represents a sectional view of an ice cream scoop embodying the invention.

Referring to the drawings, the ice cream scoop is shown to include a rod 6 having a head 3, which retains the arcuate plate 10 on the rod. The plate 10 and head 3 are soldered to a semi-spherical bowl 11. A hand grip 5 is mounted on the opposite end of rod 6, and interposed between the handle 5 and plate 10 is a tube 9, and positioned between the tube and the handle is the transverse portion 21 of a bracket which has a portion 22 parallel to the tube 9.

The plate 10, tube 9, bracket portion 21 and hand grip 5 are all clamped tightly together by means of a screw 8 which abuts an end of the handle and threadedly engages the rod 6.

The rod 6 has a flattened portion 7 having an aperture through which passes a brushing 20 and a pivot pin 19, which also passes through the handle 5. Attached to pin 19 is a lever 18 having an integral arcuate rack 17 in engagement with a pinion 15 attached to a shaft 14 which are respectively in the plate 10 and an upstanding portion of bracket 22.

Attached to the shaft 14 is a semi-circular scraper 12, having its opposite end rotatably mounted in the wall of the bowl 11. The scraper 12 is for the well known purpose of loosening ice cream in the bowl so that it may be easily removed.

Figure 2:
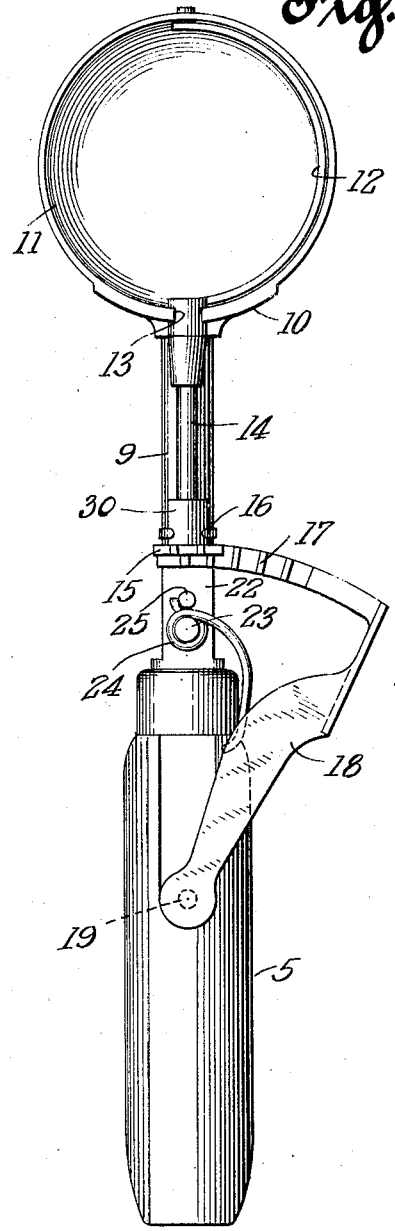
Figure 2 represents a plan view of the ice cream scoop.

Projecting up from the bracket 22 is a pin 23 about which is wound a torsion spring 24, having one end engaging a pin 25 on the bracket, and the other end engaging the lever 18. The spring 24 normally urges the lever to the extreme position as shown in Figure 2. When pressure is applied to the lever, the movement of the rack 17 causes rotation of the pinions 15 and the scraper 12.

From the above description, it will be seen that I have provided a structure which may readily be assembled and manufactured at a small cost. By employing the rod and tube construction for the shank, the heretofore large cost of making shanks in the foundry is greatly reduced, at the same time a shank may be finished in less time than is required to finish a forged shank.

By pivoting the lever 18 on the hand grip, the number of parts adjacent the bowl is reduced, and consequently there are fewer parts to get dirty, and the cleaning of the scoop is facilitated.

Also, the pivoting of the lever on the hand grip enables the use of the assembled shank as above described, as it is not necessary to provide pivoting means on the shank.

The enlarged head journalled in bearing 16 is a collar 30 frictionally or otherwise mounted on the shaft 14 and abutting the pinion 15. The diameter of the collar 30 is greater than the distance between the forked extremities of the bearing 16, and when in the position shown in the drawings, the shaft is positively held in position in the bearings.

When it is desired to disassemble the device, the collar 30 is slid along the shaft 14 away from pinion 15 and out of the bearing 16. The shaft 14 may then be passed between the extremities of bearing 16, so that it may be manipulated in order to remove the scraper 12.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In an ice cream scoop, a straight rod, a bowl, means for securing the bowl to the rod, a bracket detachably mounted on the rod, a hand grip on the rod, and a lever pivoted on the hand grip, a scraper mounted in the bowl, and means supported by the bracket and operable by the lever to rotate the scraper.

2. In an ice cream scoop, a rod, a bowl secured at one end to the rod, a tube surrounding the rod, a hand grip mounted on the other end of the rod, said tube being positioned between the hand grip and bowl, a bracket on the rod and positioned between the hand grip and tube, means to tightly clamp the bowl, tube, bracket and hand grip together, a stub shaft supported by the bracket and the bowl, a scraper fixed to the stub shaft, a pinion fixed to the shaft, a lever pivotally mounted on the hand grip, and an arcuate rack carried by the lever and engaging the pinion to rotate the scraper.

3. In an ice cream scoop, a rod, an arcuate plate mounted at one end of the rod, a bowl secured to the plate, a hand grip mounted on the other end of the rod, a tube surrounding the rod and positioned between the plate and the hand grip, means to tightly clamp the plate, tube and hand grip together, a portion of the rod in the hand grip being flattened, a pin passing through the flattened portion and the hand grip, and a lever pivoted on the pin.

4. In an ice cream scoop, a rod, a bowl secured to one end of the rod, a hand grip mounted on the rod, a tube surrounding the rod, a bracket mounted on the rod, and positioned between the tube and hand grip, means to tightly clamp the tube, bracket and hand grip together, a shaft having one end journalled in a bearing on the bowl, a collar slidably mounted on the other end of the shaft and journalled in a bearing on the bracket, a scraper carried by the shaft, a pinion fixed to the shaft, a lever pivotally mounted on the hand grip, and an arcuate rack carried by the lever and engaging the pinion to rotate the shaft and scraper.

This specification signed this 20th day of March, 1931.

CHARLES G. PALMER.